United States Patent Office 3,181,556
Patented May 4, 1965

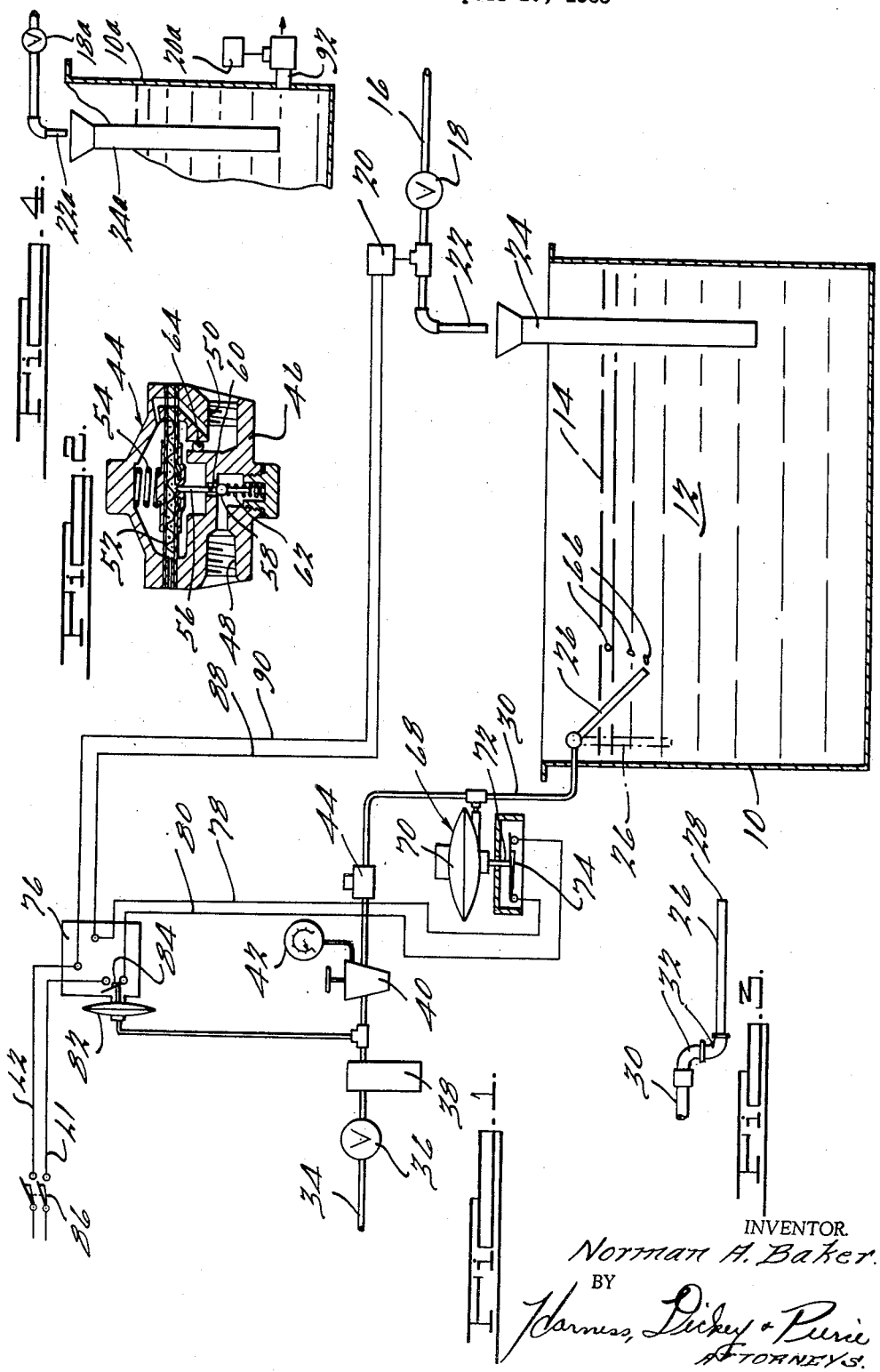

3,181,556
LIQUID LEVEL CONTROL
Norman A. Baker, Grosse Pointe Farms, Mich., assignor to Hooker Chemical Corporation, Niagara Falls, N.Y., a corporation of New York
Filed Apr. 10, 1963, Ser. No. 272,036
1 Claim. (Cl. 137—389)

The present invention broadly relates to a liquid level control system for automatically maintaining the level of liquid in a receptacle within a prescribed range, and more particularly to a system of the foregoing type which utilizes variations in the hydrostatic head above an outlet in a fluid supply conduit immersed in the receptacle to effect a controlled flow of liquid into and out of the receptacle to maintain the liquid level substantially constant.

The liquid level control system comprising the present invention is applicable for accurately controlling the level of liquid within a prescribed range in any one of a variety of receptacles and is particularly suitable for controlling the level of solutions in treating receptacles through which workpieces are processed. A large number of automated processing apparatuses are presently in use in which workpieces are automatically conveyed through a sequence of treating stations including liquid treating receptacles in order to achieve a desired surface treatment of the workpieces. Conventionally, the workpieces are supported on suitable work racks which are conveyed through the liquid treating receptacles or are conveyed adjacent thereto and subjected to a spray comprised of the treating solutions in the receptacles. In either event, variable quantities of the liquid at each treating station are lost through evaporation to the atmosphere and as a result of dragout on the surfaces of the workpieces. The rate of depletion of the liquid will vary depending upon the particular configuration of the workpieces being treated, the surrounding ambient conditions, the characteristics of the solution, etc.

In order to assure uniformity in the treatment of successive workpieces passing through a treating station, it is necessary among other things, to assure that the level of the liquid at that station remains substantially constant. Variations in the rate of liquid loss and carry out at such treating stations as a result of variations in the type and size of the workpieces and in the processing time has prevented satisfactory manual control of the solution level resulting in large fluctuations in liquid level producing variations in the treating efficiency of successive workpieces.

It is accordingly, a principal object of the present invention to provide a simple, accurate and completely automatic system for controlling the level of a liquid within a receptacle which overcomes the disadvantages of the tedious and haphazard manual control techniques heretofore employed.

Another object of the present invention is to provide a liquid level control system which can be simply installed at any one or at a plurality of liquid treating stations and which provides for a completely automatic control of the liquid level at each station.

Still another object of the present invention is to provide a liquid level control system which is substantially immune to fouling or corrosive attack by the acidic or alkaline solutions with which it is associated and which further incorporates fail-safe means therein avoiding any overfilling of the receptacle in the event of system malfunction.

A further object of the present invention is to provide a liquid level control system that is of simple design, durable operation, of versatile use, of simple adjustment, and of economic manufacture and operation.

The foregoing and other objects and advantages of the present invention are achieved by a liquid level control system including a conduit immersed in a liquid which is provided with an outlet therein disposed beneath the surface of the liquid and which is supplied with a substantially constant volumetric flow of fluid effecting a constant bubbling of the fluid out through the outlet into the liquid. Suitable sensing means are associated with the conduit for sensing variations in the pressure of the fluid as established by variations in the hydrostatic head of liquid above the outlet and means operable responsive to the sensing means for controlling the volumetric flow of makeup liquid into or drainout liquid out of the receptacle when the pressure in said conduit deviates a preselected magnitude from a preset magnitude providing the necessary corrective action and thereby maintaining the liquid level within prescribed limits.

Other objects, features, and advantages of the present invention will become apparent from the subsequent description, taken in conjunction with the accompanying drawings, wherein:

FIGURE 1 is a side elevational view partly schematic and partly in section illustrating a liquid treating receptacle provided with a liquid level control system constructed in accordance with the preferred embodiments of the present invention;

FIGURE 2 is an enlarged longitudinal sectional view through a flow control valve which maintains a substantially constant flow of fluid through the conduit in spite of variations in the pressure of the fluid;

FIGURE 3 is an enlarged fragmentary plan view of the swivel connection by which the conduit is adjustably positioned in the treating receptacle; and FIGURE 4 is a fragmentary sectional view of a treating receptacle provided with intermittently operable drain means in accordance with an alternate satisfactory embodiment of the present invention.

Referring now in detail to the drawings, an exemplary installation of the liquid level control system is illustrated in FIGURE 1 associated with a suitable tank or treating receptacle 10 containing a solution 12 therein which is to be maintained at a level indicated by the dash line 14. It will be understood that while the liquid level control system comprising the present invention is particularly adaptable for treating receptacles employed in commercial liquid treating processes, the system is equally applicable for maintaining a substantially constant liquid level in any one of a number of tanks or receptacles where a substantially constant liquid level is of importance.

Makeup liquid is supplied to the tank 10 through a supply pipe 16 provided with a manual shutoff valve 18 and a remotely actuable valve such as a motor driven or solenoid valve 20 which is selectively operable to intermittently add makeup liquid when the level of the solution 12 drops below a predetermined height. The supply pipe 16 is provided with a downwardly extending nozzle 22 which is aligned with a stand pipe 24 for discharging the makeup liquid at a level substantially below the upper surface of the liquid in the tank.

The control system for intermittently energizing the remotely actuable solenoid valve 20 comprises a fluid actuated electrical control system which operates in response to fluctuations in fluid pressure in a bubbler conduit 26 formed with an outlet 28 in the end thereof which is adjustably positionable beneath the surface 14 of the solution and from which a substantially constant flow of fluid is emitted. Conventionally, and in accordance with the exemplary embodiment shown in the drawings, the control fluid comprises air or an alternate satisfactory gas which is compatible with the liquid solution. The bubbler conduit 26 as best seen in FIGURE 3, is connected to a supply pipe 30 by means of a pair of swivel L's 32 enabling the outlet end 28 thereof to be positioned at a desired level below the upper edge of the tank 10 to enable the selection of the desired level at which the liquid in the tank is to be maintained. An alternate adjusted position of the bubble conduit 26 disposed in a substantially vertical position as illustrated in phantom in FIGURE 1.

The supply system for supplying a substantially constant volumetric flow of fluid, such as air, to the bubbler conduit will now be described wtih particular reference to FIGURES 1 and 2. As shown in FIGURE 1, high pressure air or other suitable fluid is supplied from a supply pipe 34 provided with a manual shutoff valve 36 and a strainer 38 to remove any entrained liquids or impurities therefrom. A pressure reducing valve 40 incorporating a pressure gauge 42 is connected in the high pressure air supply pipe to reduce the pressure to within the operating pressure range of a constant flow control valve 44 mounted downstream therefrom. When line pressures are available within the pressure operating range of the constant flow control valve 44, the use of a pressure reducing valve 44 can be eliminated.

The constant flow control valve 44 is best seen in FIGURE 2 and comprises a constant-differential relay of a type well known in the art, which maintains a substantially constant rate of flow therethrough in spite of fluctuations in upstream and downstream fluid pressure. The exemplary valve as shown in FIGURE 2, comprises a housing 46 formed with an inlet port 48 and an outlet port 50 which are suitably threaded to receive the air pressure supply pipe 34 at the inlet end and the supply pipe 30 at the outlet end thereof. A diaphragm 52 is mounted within the housing 46 and is resiliently biased downwardly by a coil spring 54. A stem valve 56 is connected to the diaphragm 52 and is formed with a ball 58 thereon which is adapted to be seated against a port 60 in a transverse wall of the housing 46. The stem valve 56 is resiliently biased by a coil spring 62 in a direction opposite to the coil spring 54.

Regulation of the flow of fluid through the valve is achieved by a needle valve 64 disposed between the inlet port 48 and the outlet port 50 of the housing. For each setting of the needle valve 64 a certain pressure drop occurs across the needle valve which, in accordance with the compensating features performed by the stem valve and diaphragm 52 maintains the pressure drop and the flow rate of fluid out through the outlet port 50 substantially constant in spite of fluctuations in the inlet pressure or in the outlet pressure of the fluid passing from the outlet 28 in the bubbler conduit 26. In accordance with the practice of the present invention, the needle valve 64 is set so that a constant stream of air bubbles 66 as indicated in FIGURE 1, is discharged from the outlet 28 of the bubbler conduit throughout the range of fluctuation of the liquid level in the receptacle. Typically, when the outlet of the bubbler conduit is disposed approximately three inches below the surface 14 of the liquid flow rates of air ranging from about one to about two standard cubic feet per hour provide for a satisfactory bubbling rate of air through an aqueous solution. A constant flow control valve of the type shown in FIGURES 1 and 2 is commercially available from Moore Products Co. of Philadelphia, Pennsylvania.

It will be apparent from the foregoing that as the level of liquid in the tank 10 decreases, the hydrostatic head above the outlet 28 in the bubbler conduit 26 will decrease resulting in a corresponding decrease in the fluid pressure in the bubbler conduit 26 as controlled by the constant flow control valve 44 to maintain the discharge rate of the bubbles 66 from the outlet 28 substantially constant. Conversely, as the level of liquid in the tank 10 increases, the hydrostatic head increases requiring an increase in the fluid pressure in the bubbler conduit 26 to maintain the constant flow of bubbles. Accordingly, the variations in fluid pressure in the bubbler conduit 26 and in the supply pipe 30 can be sensed and correlated directly to the level of liquid above the discharge outlet 28 in the bubble conduit and to provide the requisite corrective action whenever the level rises or falls below a preselected magnitude.

In accordance with the present invention this is simply achieved by employing an air flow switch 68 of the type well known in the art, which is connected to the supply pipe 30 for sensing fluctuations in the gas pressure thereof. The air flow switch 68 as shown in FIGURE 1 incorporates a chamber 70 having a diaphragm therein which is connected by means of a link 72 to a suitable mercury switch schematically indicated at 74 which closes its contact when the pressure drops below a preselected magnitude and opens its contact when the pressure rises above a preselected magnitude.

Air flow switches of the general type in which the air flow switch 68 is categorized incorporate an inherent lag or overlap therein such that the opening or closing of its contacts on moving from a lower to a higher pressure occurs at a certain pressure point whereas the opening or closing of the same contacts on moving from a higher to a lower pressure occurs at a differential lower pressure providing a lag or overlap to avoid switch actuation in response to only infinitesimal changes in pressure. This inherent overlap in the air flow switch prevents over control of the system and enables the level of the liquid to fluctuate slightly between prescribed limits. The overlap incorporated in the switch conventionally is of a magnitude such that the switch make and break points control the maximum to minimum liquid level fluctuations within about a quarter of an inch above and below the selected level. Air flow switches of this general type are available from the Dewey Gas Furnace Company of Detroit, Michigan.

The switch contact 74 of the air flow switch 68 is electrically connected to a junction box indicated at 76 by means of conductors 78 and 80. The junction box 76 is preferably provided with an air pressure safety switch 82 which is adapted to close its contact 84 when suitable control fluid pressure is present in the high pressure supply line 34 to avoid energization of the electrical control system in the absence or in the event of failure of control pressure providing fail-safe operation. Line current is supplied to the junction box through a main disconnect switch indicated at 86 connected to conductors L1 and L2. The junction box 76 in turn is electrically connected to the solenoid valve 20 by means of conductors 88 and 90.

In operation, the air supply system is energized by opening shutoff valve 36 admitting high pressure air to the system which is stepped down in pressure by the pressure reducing valve 40 and is discharged at a substantially constant preselected flow rate as controlled by the constant flow control valve 44 out through the outlet 28 in the bubbler conduit 26. The electrical system is energized in response to the closing of main disconnect switch 86 which supplies line current to the junction box 76. The supply of makeup liquid is activated by opening shutoff valve 18. The existence of an adequate supply of line pressure effects a closing of pressure safety switch contact 84 supplying current to opposite terminals of the contact 74 of air flow switch 68. Assuming that the tank 10 is empty of liquid, only a minimal pressure exists in the pipe 30 for supplying a preselected constant flow of gas out through the bubbler conduit 26. Accordingly, this low pressure effects actuation of the air flow switch 68 which closes its contact 74 energizing the coil of solenoid valve 20 enabling discharge of makeup liquid into the tank.

The level of liquid progressively increases in the tank 10 until the outlet 28 of the bubbler conduit 22 is immersed below the level of the liquid therein. As the liquid level progressively rises, the hydrostatic head causes the constant flow control valve 44 to increase the pressure of air in the supply line 30 to maintain a constant discharge of bubbles 36 out through the bubbler conduit. The air pressure continuously rises in accordance with the rising level of the liquid until a preselected pressure is attained at which the air flow switch 68 opens its contact 74 de-energizing the solenoid valve 20 and stopping the flow of makeup liquid into the tank. As the liquid in the tank 10 is consumed through evaporation, dragout, or the like, the level 14 thereof progressively drops causing a progressive decrease in the pressure in the line 30 to maintain a constant discharge of bubbles from the bubbler conduit 26. When the pressure drops to a preselected limit, the air flow switch 68 again closes its contact 74 energizing the solenoid valve 20 and enabling the addition of makeup liquid to the tank. The makeup liquid is added until the level in the tank again attains a level at which the air pressure in the pipe 30 attains a preselected magnitude effecting actuation of the air flow switch 68 which opens its contact 74 closing the solenoid valve 20. In accordance with this system, the level 14 of the liquid in the tank 10 is maintained with a relatively narrow range assuring substantially uniform treatment of successive workpieces.

In the event a failure occurs in the apparatus supplying high pressure air or other fluid to the pneumatic control system, the loss of pressure below a safe operating level will effect the opening of contact 84 of pressure safety switch 82 which prevents energization of the solenoid valve 20. Accordingly, overfilling of the tank 10 with makeup liquid is avoided in the event of such a failure.

In accordance with the operation of the system hereinabove described, the level of liquid in the tank 10 is maintained substantially constant by the periodic controlled addition of makeup liquid thereto. The liquid level control system comprising the present invention is equally applicable to other arrangements for maintaining dynamic equilibrium between liquid inflow and outflow relative to the tank. An alternative typical arrangement from that previously described is illustrated fragmentarily in FIGURE 4 wherein like parts are designated by the same numerals previously employed with the suffix letter "a" added thereto. As shown in FIGURE 4, the tank 10a is provided with a standpipe 24a into which makeup liquid is constantly discharged through a nozzle 22a in response to the opening of a shutoff valve 18a. The constant flow of makeup liquid into the tank 10a is controlled so as to exceed the rate of dissipation or loss of liquid from the tank so as to provide a constant tendency for the level of the liquid in the tank to rise. Avoidance of overfilling of the tank and the control of the level of liquid therein within relatively narrow ranges is achieved by the incorporation of a drain conduit 92 in the lower portion of the tank to which a remotely actuable solenoid valve 20a is connected and is actuable in response to the liquid level control system for intermittently draining liquid therefrom responsive to the pressure of fluid in the bubbler conduit in a manner as previously described. In accordance with the arrangement as shown in FIGURE 4, the liquid level control system is operative to open the solenoid valve 20a when the fluid pressure in the bubbler conduit exceeds a preselected magnitude and to close the solenoid valve when the fluid pressure drops below a preselected magnitude. It will be apparent from the foregoing that the systems as shown in FIGURES 1 and 4 each provide for the automatic dynamic control of liquid flow into and out of a treating receptacle or tank maintaining a substantially constant level of liquid therein.

While it will be apparent that the preferred embodiments herein illustrated are well calculated to fulfill the objects above stated, it will be appreciated that the invention is susceptible to modification, variation, and change without departing from the proper scope or fair meaning of the subjoined claim.

What is claimed is:

A liquid level control system for maintaining the level of a liquid in a tank within prescribed limits comprising a conduit immersed in the liquid and provided with an outlet disposed below the liquid, means for supplying a substantially constant flow of fluid to said conduit for discharge through said outlet, a first pressure switch connected to said conduit for sensing fluctuations in the pressure of said fluid in said conduit in response to fluctuations in the hydrostatic head of the liquid above said outlet in said conduit, means for supplying makeup liquid to the tank incorporating remotely actuable valve means therein, said first switch operable to open said valve means for adding liquid to the tank in response to a preselected drop of the pressure of said fluid and to close said valve in response to an increase in the pressure of said fluid above a preselected magnitude, and a second pressure switch connected to the first mentioned said means for supplying fluid to said conduit and operative in response to the reduction in pressure in the supply fluid below a preselected magnitude to deenergize said valve means in overriding relationship relative to said first pressure switch.

References Cited by the Examiner
UNITED STATES PATENTS

| | | | |
|---|---|---|---|
| 2,339,469 | 1/44 | Emanuel | 137—414 |
| 2,820,357 | 1/58 | Henrici | 137—403 XR |
| 2,833,411 | 5/58 | Bosman et al. | 137—403 XR |
| 2,988,099 | 6/61 | Langhans | 137—82 |
| 3,104,678 | 9/63 | Cole | 137—403 |

FOREIGN PATENTS 312,246   5/19   Germany.

ISADOR WEIL, *Primary Examiner.*

WILLIAM F. O'DEA, *Examiner.*